Dec. 1, 1936.  S. JOHNSON, JR  2,062,812
MOTOR VEHICLE CONTROL MECHANISM
Filed March 23, 1934   2 Sheets-Sheet 1
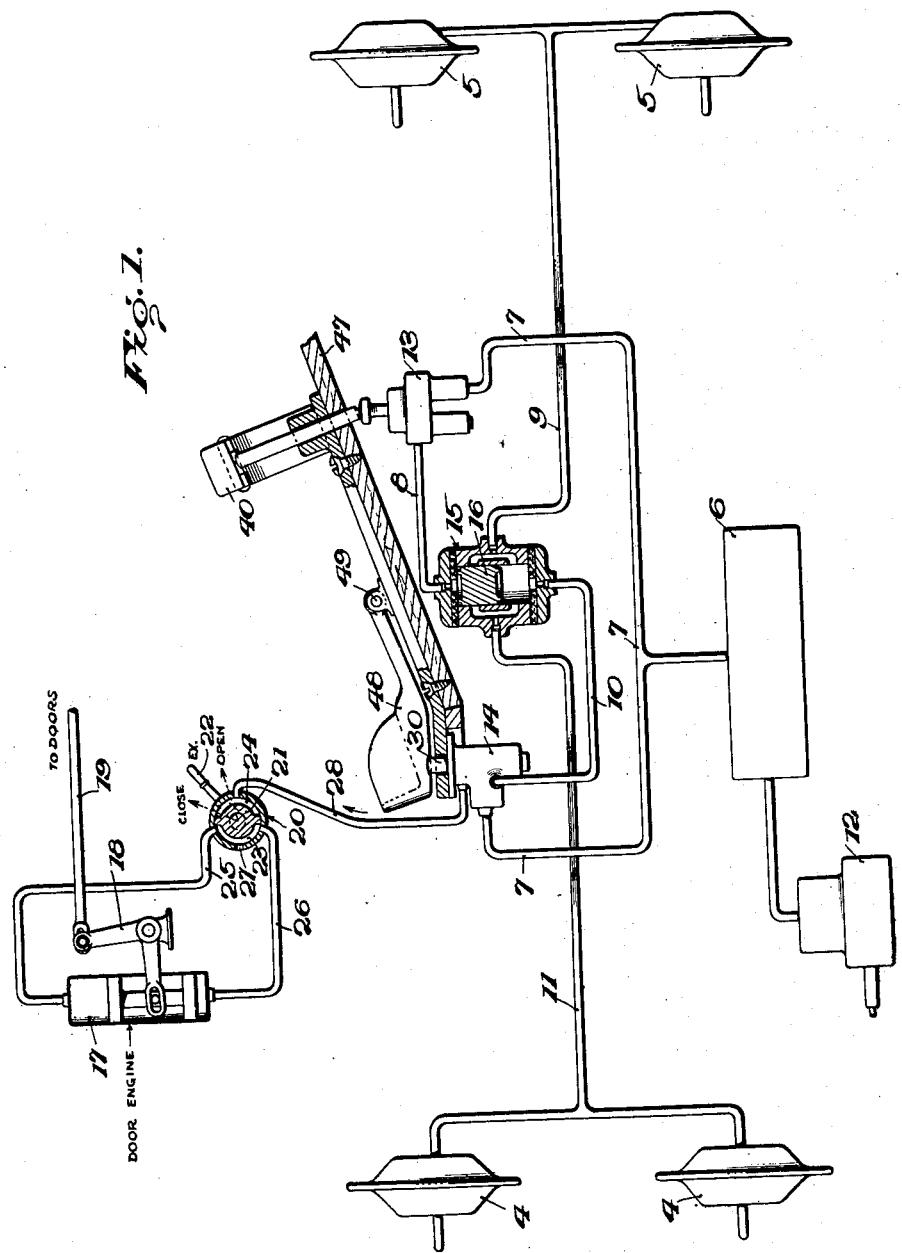

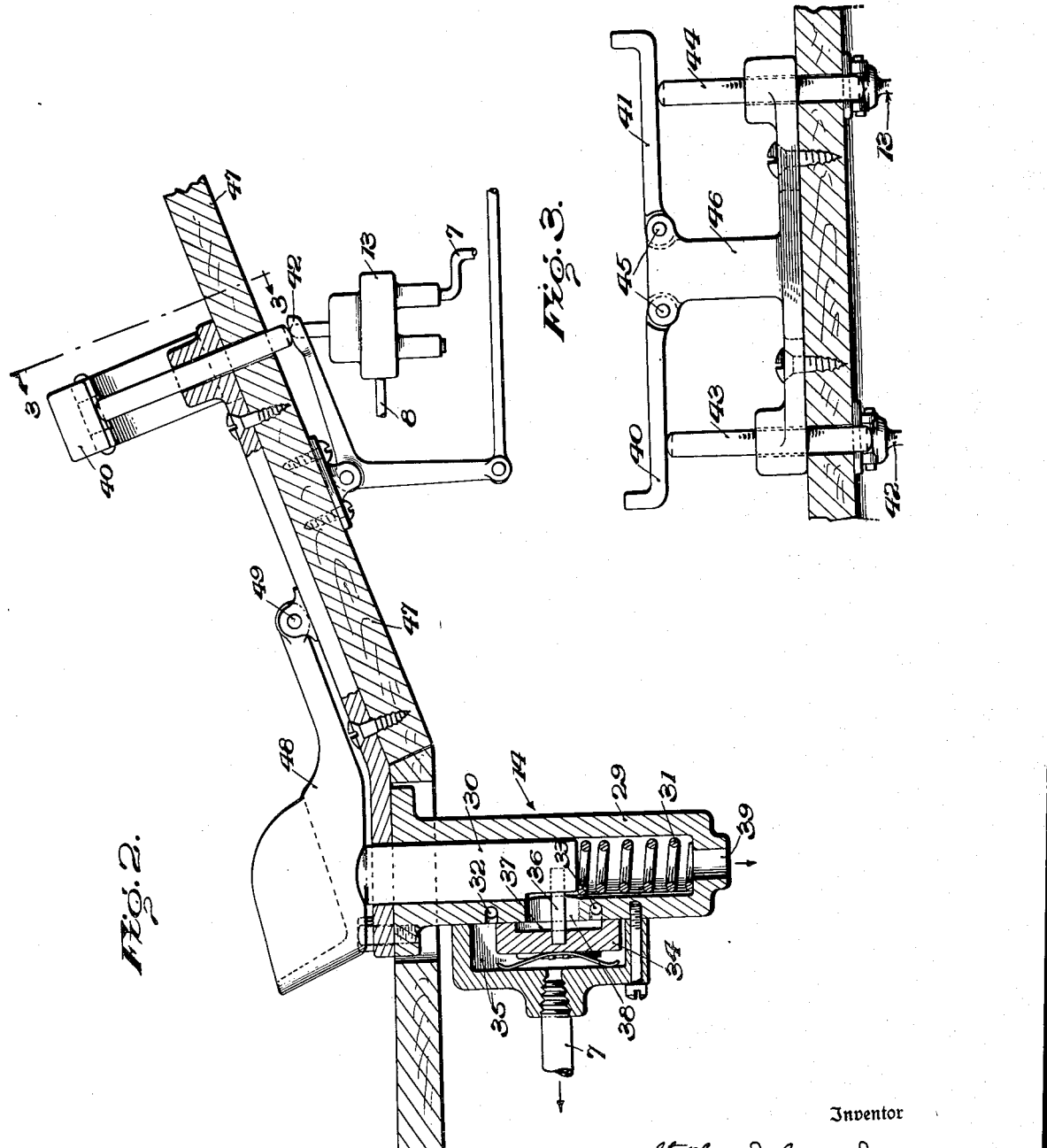

Patented Dec. 1, 1936

2,062,812

UNITED STATES PATENT OFFICE 2,062,812

MOTOR VEHICLE CONTROL MECHANISM

Stephen Johnson, Jr., Pittsburgh, Pa., assignor to Bendix-Westinghouse Automotive Air Brake Company, Pittsburgh, Pa., a corporation of Delaware Application March 23, 1934, Serial No. 717,046

8 Claims. (Cl. 303—6.1)

This invention relates to a motor vehicle control mechanism and more particularly to a control mechanism adapted to be operated by a fluid pressure differential.

One of the objects of the present invention is to provide a vehicle controlling mechanism wherein a plurality of vehicle controls may be readily and advantageously controlled by an operator from a compactly arranged construction so constituted as to be readily operable by the foot of an operator.

Another object of the invention is to provide a novel pedal-operated controlling mechanism for effecting actuation of the vehicle engine accelerator, the brakes, and the vehicle doors.

Another object is to provide a novel arrangement whereby, in the event that the operator becomes incapacitated or otherwise relinquishes control of the vehicle, the power to the vehicle engine will be automatically arrested, an emergency application of the brakes will be effected, and the fluid pressures on the door engine will be balanced in order that the motion of the vehicle will be quickly arrested and the passengers therein will be able to manually open the vehicle doors.

A further object is to provide, in a controlling mechanism of the above character, a novel pedal arrangement comprising independently-operable sections so constituted that the application of the vehicle brakes in service and the control of the vehicle engine accelerator may be effected by a lateral shift of the foot of the operator, while the application of the brakes in an emergency is effected by removal of the foot of the operator from one of the pedal sections.

A still further object is to provide a novel arrangement of parts so constituted as to effect an unusually compact and efficient arrangement and one in which it is unnecessary for the operator to become accustomed to any new or unusual control movements.

Other advantages and novel features of the invention will appear more fully hereinafter from the following detailed description when taken in connection with the accompanying drawings, wherein one embodiment of the invention is illustrated. It is to be expressly understood, however, that the drawings are for purposes of illustration only and are not to be construed as a definition of the limits of the invention, reference being had for this purpose to the appended claims.

In the drawings, wherein similar reference characters refer to similar parts throughout the several views:

Fig. 1 is a diagrammatic view of a motor vehicle control mechanism embodying the present invention;

Fig. 2 is a side view partly in section of the novel pedal arrangement, and

Fig. 3 is an end view of the toe-operated pedals taken along line 3—3 of Fig. 2.

Referring more particularly to Fig. 1, the invention is disclosed therein as being associated with a motor vehicle of the type having a fluid pressure braking system and including rear and front brake chambers 4 and 5 adapted to be supplied with fluid under pressure from reservoir 6 through conduits 7, 8, 9, 10, and 11, a suitable compressor 12 being provided for maintaining a desired fluid pressure in the reservoir.

According to the present invention, a pair of independently-operable brake valve devices are utilized for supplying fluid under pressure to the brake chambers 4 and 5 to effect a service or emergency application of the brakes. As shown, a service brake valve 13 is interposed between conduits 7 and 8 for supplying fluid under pressure to conduits 9 and 11 for effecting a service application of the brakes, while an emergency brake valve device 14 is interposed between conduits 7 and 10 for supplying fluid under pressure to conduits 9 and 11 for effecting an emergency application of the brakes. In order to effectively isolate each of said brake valves when the other becomes operative, a double check valve 15 is arranged at the junction of conduits 8, 9, 10, and 11, the said check valve containing a piston 16 so arranged that when either of the brake valve devices 13 or 14 becomes operative, communication between the line leading from the other brake valve device to the conduits 9 and 11 will be interrupted.

The invention also contemplates the provision of a vehicle door-controlling device to control the opening and closing movements of the vehicle doors, and as shown in Fig. 1, such means comprises a double-acting door engine 17 operatively connected to the vehicle doors by any suitable means such as a bell crank 18 and rod 19. Fluid under pressure for operating said door engine is preferably controlled by a suitable door valve device 20 which may be moved to any one of three positions, namely to open the doors, to close the doors, or to exhaust the engine 17. Such valve device comprises a rotatable plug 21 having an operating handle 22 and ports 23 and 24 therein and, as shown, the fluid pressures on the door engine are balanced, by reason of the connection of the two ends thereof to atmosphere through conduits 25, 26, port 23 and exhaust opening 27. Upon movement of the valve-controlling handle 22, however, to either door-opening or door-closing position, one or the other of the conduits 26 or 25 is supplied with fluid under pressure through conduit 28 and port 24, while the other conduit leading to the door engine is connected with the exhaust opening 27.

Preferably, the emergency valve device 14 is so constituted that in normal operation the same will be inoperative to apply the brakes in an emergency and will serve to interconnect conduits 7 and 28 in order to furnish a supply of fluid under pressure to the valve device 20 for effecting operation of the door engine 17. Referring more particularly to Fig. 2, the valve device 14 is constituted by a casing 29 having a plunger 30 reciprocatingly mounted therein and normally resiliently urged upwardly as by means of a spring 31, as viewed in this figure. The casing 29 is provided in its side wall with ports 32 and 33 communicating with conduits 28 and 10 respectively, and communication between these ports and conduit 7 is controlled by a slide valve 34 mounted in a chamber 35, said valve being operatively connected with plunger 30 as by means of pin 36. The valve 34 is constituted in such a manner as to provide a cavity 37 which is in constant communication with an opening 38 in the wall of casing 29 which latter communicates with the atmosphere through an exhaust port 39. In the normal position shown in Fig. 2, wherein the plunger 30 has been depressed against the tension of spring 31, the port 32 communicates with conduit 7, whereas the port 33 communicates with the exhaust port 39 through the cavity 37 and opening 38. On the other hand, if downward pressure on plunger 30 is removed, the spring 31 will move the plunger and valve 34 to such a position as to connect conduit 7 with port 33 and establish communication between port 32 and the atmospheric port 39 through the cavity 37 and opening 38. Since valve 14 is not of the graduating type, a suitable choke, not shown, may be inserted in conduit 10 if desired in order to slightly retard the flow of fluid under pressure to the braking chambers and hence avoid an abrupt stop.

From the above, it will be readily understood that the emergency valve is normally inoperative when sufficient pressure is applied to the plunger of said valve to move the parts to the position shown in Fig. 2 and that in this position fluid pressure will be available for operating the door engine.

In order to control the operation of both the service and emergency valves as well as the accelerator of the vehicle engine, a novel pedal arrangement is employed which is so constituted that the above mentioned parts may be operated by the foot of the operator in a simple and efficient manner. Such pedal arrangement as shown in Figs. 2 and 3 is constituted by three independent pedal sections, two of which may be operated by the toe of the operator and the third adapted to be operated by the heel of the operator. As shown, the toe-operated sections comprise pivoted laterally-spaced members 40 and 41, the former of which is adapted to actuate the accelerator control 42 through plunger 43, while the latter is adapted when depressed to operate the service brake valve device 13 through the plunger 44. Each of the pedal sections 40 and 41 is suitably pivoted as at 45 to a standard 46 carried by the footboard 47 of the motor vehicle.

A third pedal section 48 shaped in the form of a heel rest is adapted when receiving the heel of the foot of the operator to normally maintain the emergency valve 14 in inoperative position as shown in Fig. 2 and this particular section is preferably pivotally mounted as at 49 to the floor-board 47 adjacent the toe-operated pedal sections or at a point intermediate the extremities of the sections 48 and 40, 41. In this manner the foot of the operator will occupy a comfortable and natural position when the pedal section 48 is engaged, to the end that efficient operation of the pedal sections 40 or 41 may be secured by merely shifting laterally from one section to the other.

From the above, it will be readily understood that with the foot of the operator in position upon pedal section 48, the emergency valve will be normally inoperative and a supply of fluid under pressure will be available to operate the door engine 17. The control of the engine power is readily effected by depressing the pedal section 40, while normal service braking is accomplished by depressing the pedal section 41 in order to operate the service brake valve 13 to establish a flow of fluid under pressure to the reservoir 6 through lines 7 and 8, check valve 15 and lines 9 and 11. In the event, however, of incapacitation of the operator and release of pressure from the heel-operated pedal section 48, the spring 31 will immediately raise plunger 30 and valve 34 carried thereby to establish communication between the reservoir 6 and the braking chambers to effect an emergency application of the brakes through conduit 7, port 33, line 10, check valve 15 and lines 9 and 11. It will be observed that the emergency valve also connects line 28 from the door-controlled valve device to atmosphere through port 32, cavity 37, opening 38 and atmospheric port 39, thus balancing the fluid pressures on the door engine 17 and permitting passengers in the vehicle to manually open the vehicle doors.

There has thus been provided by the present invention a simple and efficient vehicle power controlling system, wherein service and emergency application of the brakes may be effected without resorting to operations with which the operator is not familiar. The provision of the toe-operated pedal sections for operating the engine accelerator connection and the service brake valve enables these two controls to be operated by a mere lateral shift of the foot of the operator, while the provision of the independent heel section mounted in such a manner that the heel of the operator normally depresses the same to render the emergency valve inoperative, not only effectively controls operation of the emergency valve in the event of incapacitation of the driver but also provides a comfortable heel rest for the foot of the operator in controlling the toe-operated pedal portions in the usual manner.

While only one embodiment of the invention has been disclosed and described herein, it is to be expressly understood that the same is not limited thereto but may be embodied in various other forms as are comprehended by the scope of the appended claims.

What is claimed is:
1. In a motor vehicle control apparatus for fluid pressure brakes, the combination with a fluid pressure door engine for opening and clos- ing the vehicle doors, and a door valve device for controlling the fluid pressure for operating said door engine, of a brake valve device for controlling the fluid pressure brakes on the vehicle, a conduit connecting said valve devices, means for supplying fluid under pressure to said conduit through said brake valve device when said brake valve device is inoperative, and means to move said brake valve device to operative position to apply the brakes and to balance the fluid pressures on said door engine.

2. In a motor vehicle controlling apparatus having independent service and emergency brake valve devices, independent pedal members adapted to be engaged by the toe and heel of an operator for respectively controlling the operation of said valve devices, and means for mounting said heel-engaged pedal member for pivotal movement about a fulcrum intermediate the extremities of said pedal members.

3. A fluid pressure braking system for motor vehicles comprising a normally inoperative service valve, an emergency valve resiliently biased to operative position, a heel-operated pedal section operable to move said emergency valve to inoperative position, a toe-operated pedal section, separate from said heel-operated section and independently operable to move the service valve to operative position, and means for pivotally mounting said heel-operated section at a point intermediate the extremities of said sections.

4. In a motor vehicle control apparatus, the combination with a fluid pressure door engine for opening and closing the vehicle doors, of an emergency brake valve for controlling the vehicle brakes, a heel-operated pedal section normally depressible to render said emergency valve inoperative, means to supply fluid pressure to said valve, means including a door valve device for conducting fluid pressure from said emergency valve to said door engine when the emergency valve is in inoperative position, and means operable upon release of said pedal section to apply said brakes and balance the fluid pressures on said door engine.

5. In a motor vehicle controlling apparatus having independent service and emergency brake valve devices, independent toe and heel-operable pedal members respectively associated with said devices, and means for pivotally mounting said heel-operable pedal member between the portion thereof operatively connected to said emergency brake valve device and the toe-operable pedal member.

6. In a motor vehicle brake, the combination with a valve mechanism for controlling the brakes in service, of a valve mechanism for controlling the brakes in an emergency, and independently-operable pedal sections for controlling the operation of said valve mechanisms and adapted to be operated by the heel and toe of the foot of an operator, and means for mounting the heel-operated section for pivotal movement about a fulcrum positioned between said sections.

7. In a motor vehicle controlling mechanism, the combination with fluid pressure brakes including a valve mechanism for controlling the brakes in service, of a valve mechanism for controlling the brakes in an emergency, a fluid pressure-operated vehicle door engine, means operable to admit fluid under pressure to said engine through said emergency valve mechanism only when the latter is inoperative to apply the brakes, and means operable when said emergency valve mechanism is effective to apply said brakes for balancing the fluid pressures on said door engine.

8. In a vehicle controlling mechanism having a pair of vehicle speed-controlling devices, separate toe-operable means for selectively actuating said devices, and a heel-actuated emergency braking means separate from said first named means and depressible to inoperative position by the heel of an operator and means for mounting said second named means for pivotal movement about a fulcrum positioned between said first and second means.

STEPHEN JOHNSON, Jr.